Jan. 19, 1954  L. D. SMULLIN  2,666,899
ELECTRONIC FREQUENCY VERNIER
Filed May 1, 1946

INVENTOR
LOUIS D. SMULLIN
BY
*M. O. Hayes*
ATTORNEY

Patented Jan. 19, 1954

2,666,899

UNITED STATES PATENT OFFICE 2,666,899

ELECTRONIC FREQUENCY VERNIER

Louis D. Smullin, Detroit, Mich.

Application May 1, 1946, Serial No. 666,220

8 Claims. (Cl. 324—79)

This invention relates to electrical test apparatus, and more particularly to an electronic frequency vernier for measuring small frequency differences at microwave frequencies.

It is often desirable to measure accurately small frequency differences between signals alternating at very high frequencies. Measurements having an accuracy of approximately 25 parts per million can be performed by the use of wavemeters having extremely low electrical losses, such as cavity resonators with values of Q as high as 40,000. For some purposes, higher accuracy of determination is required.

It is a primary object of this invention to provide means for accurate measurement of very high frequencies.

It is another object of this invention to provide apparatus capable of measuring, with an accuracy of approximately 3 parts per million, the difference frequency between signals alternating at very high frequencies.

Figure 1:
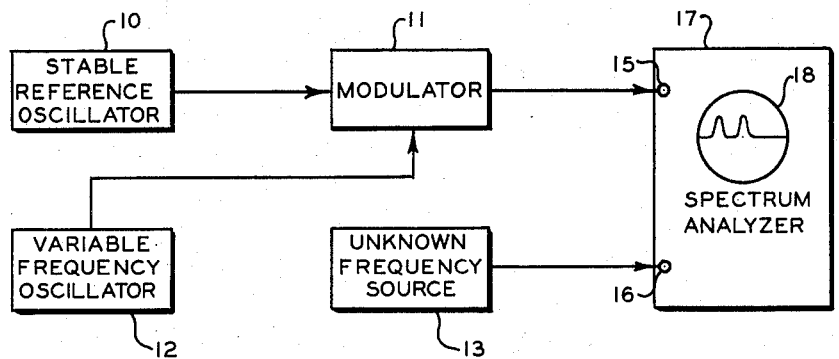
Figure 2:
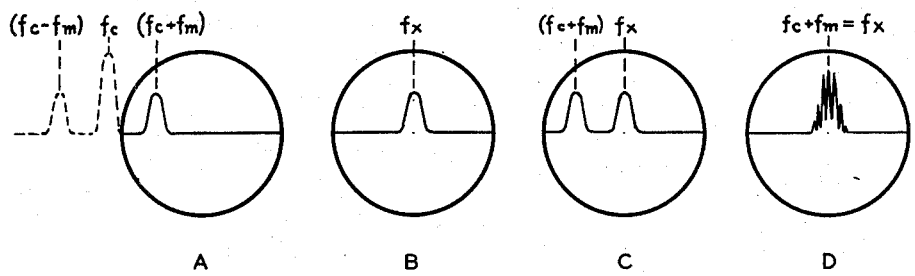

These and other objects will be more apparent upon consideration of the following description, together with the accompanying drawings, in which:

Fig. 1 is a functional block diagram of an embodiment of the present invention; and Fig. 2 shows waveforms useful in explaining the operation of the apparatus of Fig. 1.

As shown in Fig. 1, the invention involves the use of a novel combination and connection of conventional test instruments. A stable reference oscillator 10, such as a stabilized velocity-modulated oscillator circuit, having a known, fixed standard frequency output $f_c$, energizes one of two input circuits of a modulator 11. The second input circuit of modulator 11 is energized by the output of a calibrated variable frequency oscillator 12. The output of modulator 11 is connected to an input terminal 15 of a spectrum analyzer 17. The output of an unknown frequency source 13 is connected to a second input terminal 16 of spectrum analyzer 17.

Spectrum analyzer 17 is an instrument comprising essentially an oscilloscope, a frequency modulated oscillator, a mixer, and a video amplifier. The oscillator is frequency modulated by the oscilloscope time-base sweep voltage. The horizontal displacement on the screen of the cathode ray tube 18 is thus a function of frequency, which in this case is shown as increasing from left to right. The output of the frequency modulated oscillator is applied to a mixer, such as a silicon crystal, together with the externally generated voltages impressed upon the input terminals 15 and 16 of the instrument. The mixer output is amplified by a video amplifier and applied to the vertical deflection plates of the cathode ray tube 18, producing a vertical displacement of the beam which is a function of the amplitude of the beat frequency in the mixer output. The spectrum analyzer is a useful instrument for investigating output spectra of pulse modulated generators, since it provides a continuous visual plot of the frequency spectrum in the range being used.

In the present invention, the mixer circuit of the spectrum analyzer 17 is provided with two separate input circuits, represented by terminals 15 and 16. The simultaneous impression upon the input circuits of modulator 11 of the output frequency $f_m$ of variable frequency oscillator 12 and the output frequency $f_c$ of stable reference oscillator 10 will result in the production of the usual amplitude modulated power series of sum and difference frequency sidebands in the output circuit, which is connected to terminal 15 of spectrum analyzer 17. If $f_m$ is made to be relatively low compared with $f_c$, the first sidebands will be near the standard frequency $f_c$.

In operation, the mean frequency of the frequency modulated oscillator contained in spectrum analyzer 17 is adjusted so that the amplitude modulated signal impressed upon terminal 15 appears as shown in Fig. 2A, which represents the trace appearing on the screen of cathode ray tube 18. As shown, the upper sideband $(f_c+f_m)$ is caused to appear on the screen, while the carrier frequency $f_c$ and the lower sideband $(f_c-f_m)$ are shown as dotted lines along an extension of the time base for the purpose of illustration.

The output frequency $f_x$ of the unknown frequency oscillator 13, applied to terminal 16, would, if it were slightly higher than the upper sideband $(f_c+f_m)$, produce a trace as shown in Fig. 2B, assuming that terminal 15 is not energized.

Under the conditions described above, when both terminals 15 and 16 are energized the pattern shown in Fig. 2C would be produced. If the output frequency $f_m$ of oscillator 12 is then increased, causing the sum frequency $(f_c+f_m)$ to increase, the trace produced by the latter will approach that produced by the output $f_x$ of oscillator 13, finally reaching coincidence and producing the pattern shown in Fig. 2D. When coincidence is reached, as indicated by the appearance of "grass" on the trace as shown, the unknown frequency $f_x$ is equal to that of the upper sideband, ($f_c+f_m$) and can be determined easily by reference to the calibration scale of oscillator 12. The lower sideband ($f_c-f_m$) can be used similarly if it is more conveniently located in the frequency spectrum.

Since certain changes may be made in the above described apparatus and different embodiments of the invention could be made without departing from the scope thereof, it is intended that all matter contained in the above description or shown in the accompanying drawings shall be interpreted as illustrative and not in a limiting sense, and therefore that the invention is to be limited only by the prior art and the spirit of the appended claims.

What is claimed is:

1. Apparatus for measuring an unknown frequency comprising, a stable reference oscillator, a calibrated variable frequency oscillator, a modulator, said variable frequency oscillator and said modulator cooperating to produce amplitude modulation of the output of said reference oscillator, and means for indicating coincidence between a known sideband frequency thus produced and said unknown frequency.

2. Apparatus as in claim 1 in which said means for indicating coincidence comprises a spectrum analyzer having two input circuits, the output of said modulator energizing one of said input circuits, the other input circuit being energized by the source of said unknown frequency.

3. Apparatus for measuring an unknown frequency comprising, a stable reference oscillator, a variable frequency oscillator having a frequency calibrated output, a modulator for combining the outputs of said stable reference oscillator and said variable frequency oscillator to produce amplitude modulation of the output of said stable reference oscillator, a source of oscillations of unknown frequency, means for combining the output of said source with the output of said modulator, and means for indicating coincidence in frequency of said source output and selected portions of said modulator output.

4. Apparatus for measuring a signal of an unknown frequency comprising, a stable reference oscillator, a calibrated variable frequency oscillator, a modulator to which the outputs of said reference oscillator and said variable frequency oscillator are applied, and a spectrum analyzer to which said signal of unknown frequency and the output of said modulator are applied, said spectrum analyzer providing an indication of coincidence in frequency between said unknown frequency and a selected component of the output of said modulator.

5. Apparatus for measuring a signal of unknown frequency comprising, a source of signals of stable frequency, means for amplitude modulating the signals from said source at a calibrated variable frequency to produce sidebands of known frequency, means for combining said signals of unknown frequency and said amplitude modulated signals, and means coupled to said signal combining means providing a visual indication of coincidence between one of said sidebands and said unknown frequency.

6. Apparatus for measuring a signal of unknown frequency comprising, a stable reference oscillator, means for amplitude modulating the signals from said oscillator at a calibrated variable frequency, a source of oscillations of unknown frequency, means providing a visual comparison of the frequencies of said modulator output and said source output including means wherein the displacement of the visual plots of each signal is a function of frequency.

7. Apparatus for measuring a signal of unknown frequency comprising, a stable reference oscillator, means for amplitude modulating the signals from said oscillator at a calibrated variable frequency, a source of oscillations of unknown frequency, a cathode ray tube, means for combining said modulator output and said source output, means applying the combined output to said cathode ray tube, and means controlling displacement of the electron beam of said cathode ray tube whereby displacement is a function of frequency.

8. Apparatus for measuring a signal of unknown frequency comprising, a stable reference oscillator, means for amplitude modulating the signals from said oscillator at a calibrated variable frequency, a source of oscillations of unknown frequency, a cathode ray tube, means for combining and applying said outputs to the same electron beam deflecting means in said cathode ray tube whereby displacement of the beam along the geometrical axis of vision determined by said beam deflecting means is a function of frequency.

LOUIS D. SMULLIN.

References Cited in the file of this patent

UNITED STATES PATENTS

| Number | Name | Date |
|---|---|---|
| 1,939,434 | Busse | Dec. 12, 1933 |
| 1,951,524 | Nicolson | Mar. 20, 1934 |
| 2,018,356 | Hammond | Oct. 22, 1935 |
| 2,324,915 | Dow | July 20, 1943 |